(12) United States Patent
Lee

(10) Patent No.: US 7,536,498 B2
(45) Date of Patent: May 19, 2009

(54) METHOD AND APPARATUS FOR ADDRESS MAPPING

(75) Inventor: Sang-hyong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 11/262,808

(22) Filed: Nov. 1, 2005

(65) Prior Publication Data
US 2006/0112256 A1   May 25, 2006

(30) Foreign Application Priority Data
Nov. 25, 2004   (KR) ............... 10-2004-0097433

(51) Int. Cl.
*G06F 12/06* (2006.01)
(52) U.S. Cl. ................................................. 711/2
(58) Field of Classification Search ........... 711/203, 711/220, 208, 211
See application file for complete search history.

(56) References Cited

U.S. PATENT DOCUMENTS

| 6,088,780 | A | 7/2000 | Yamada et al. |
| 6,523,104 | B2 | 2/2003 | Kissell |
| 6,757,806 | B2 * | 6/2004 | Shim ........................ 711/203 |
| 7,055,015 | B2 * | 5/2006 | Shiota ........................ 711/203 |
| 7,082,509 | B2 * | 7/2006 | Zimmer et al. ............... 711/170 |

OTHER PUBLICATIONS

Andrew S. Tanenbaum, Structured Computer Organization, 1984, Prentice Hall, Inc, 2nd edition, p. 11.*
Michael Wall et al., CPSC 330 Computer Organization, Lecture 8A-IO Sub-Systems, Computer Organization & Design, The Hardware/Software Interface, Copyrights 1997 and 1998 Morgan Kaufmann Publishers. Lec8A-IOSubs pp. 1-23.
Brett Warthen, "PC Memory Architecture Overview", Apr. 15, 1992, Infinite Technologies.

* cited by examiner

*Primary Examiner*—Reginald G Bragdon
*Assistant Examiner*—Baboucarr Faal
(74) *Attorney, Agent, or Firm*—Roylance, Abrams, Berdo & Goodman, LLP

(57) ABSTRACT

A method and apparatus for address mapping are provided, wherein the method sets a first address region that is accessible by a processor when a system is booted and a second address region that is expanded by a virtual address, respectively. The first and second address regions are then mapped so that a first physical address region corresponding to a predetermined part of the first address region and a second physical address region corresponding to a predetermined part of the second address region access the same address region. Accordingly, embodiments of the present invention do not require consideration of reallocation of physical address during programming, and the decoding process for address mapping is simplified.

10 Claims, 4 Drawing Sheets

METHOD AND APPARATUS FOR ADDRESS MAPPING

CROSS-REFERENCE TO RELATED APPLICATIONS

This application claims the benefit under 35 U.S.C. §119(a) of Korean Patent Application No. 10-2004-0097433, filed in the Korean Intellectual Property Office on Nov. 25, 2004, the entire disclosure of which is incorporated herein by reference.

BACKGROUND OF THE INVENTION

1. Field of the Invention

The present invention relates to a method and apparatus for address mapping. More particularly, the present invention relates to a method and apparatus for mapping an address that is accessed by a processor in a system based on a Million Instructions Per Second (MIPS) processor.

2. Description of the Related Art

In the design of a controller to be applied to a high-performance color laser printer, the use of Million Instructions Per Second (MIPS) processors has been increased to satisfy performance requirements. However, in the case of a MIPS processor, an address region of about 0.5 GB that may be accessed without setting a Translation Look-aside Buffer (TLB) is used at booting, and other address regions are extended by means of TLB settings while programs are being executed.

FIG. 1 shows an example of an address map used in a conventional system based on a MIPS processor. Referring to FIG. 1, when decoding addresses corresponding to each region allocated to a DDR controller, GDMA controller, IO controller, PCI controller, Special Function Register, ROM controller and so on, information stored in a base address register and a size register is referenced to conduct the decoding. That is, if an address to be decoded is input to a decoder logic unit, it is determined whether the address is corresponding to a [base address~base address+size] stored in the register. A chip select (CS) signal is then generated to enable access to the corresponding region. In addition, during the program execution, a user can change values of the corresponding base address register and the size register to reallocate the corresponding regions.

For example, assume for purposes of explanation that a Double Data Rate (DDR) controller using a MIPS controller supports a DDR RAM region of 2 GB, and that 2 GB already exceeds the range of 0.5 GB that may be accessed by the MIPS processor at booting. Thus, a part of the region is mapped at booting, and this region is reallocated by means of a program after booting, so as to use the region of the 2 GB range.

In the case of FIG. 1, for a DDR region at booting, a region [0×0000_0000~0×17FF_FFFF] having a 384 MB size is mapped. With an execution of a program, the DDR region is mapped to an address region [0×4000_0000~0×BFFF_FFFF] having a 2 GB size by means of reallocation. Since the decoder logic unit including the base address register and size register for each region may reallocate the corresponding region, a user may generate a desired physical address.

However, such an address mapping method has a number of problems, including the following specific problems.

First, since the physical address is variable, additional measures are required to deal with the physical address. That is, if a physical address is varied, all entries mapped in the corresponding address should be changed in a TLB that is used for converting a virtual address into a physical address. In addition, if there is a pointer referred to in the corresponding address, any reference values should be changed. Thus, there are many additional considerations needed in programming.

Second, since a programmer may perform an address mapping as he desires, there are more possibilities for errors. For example, if several programmers take a project at the same time and each programmer individually sets a base address for each region, a border to any region set by any programmer may violate another region. In this case, an overlapped region results in the mapped region, which may cause unintended malfunctions.

Third, a decoder logic unit for decoding an address corresponding to each region becomes complicated and can deteriorate performance. That is, since a base address of each region is varied, combination logic for comparing a base address register and a size register is required for every region. This may be a factor resulting in deteriorating the decoding performance. Furthermore, since combination logics should preferably be added in the decoder logic unit in proportion to the number of supported regions, the complexity of the entire decoder logic is increased.

Accordingly, a need exists for a system and method for efficiently and effectively mapping an address that is accessed by a processor in a system based on a MIPS processor.

SUMMARY OF THE INVENTION

Therefore, it is an object of the present invention to substantially solve the above and other problems, and provide an address mapping method and apparatus that may simplify the configuration of a decoder logic unit and improve its performance by facilitating easy reallocation of a physical address.

In order to accomplish the above and other objects, embodiments of the present invention provide a method for address mapping which comprises the steps of setting a first address region that is accessible by a processor when a system is booted and a second address region that is expanded by a virtual address, and mapping the first and second address regions so that a first physical address region corresponding to a predetermined part of the first address region and a second physical address region corresponding to a predetermined part of the second address region, access the same address region.

The processor is preferably comprised of a Million Instructions Per Second (MIPS) based processor, and the same address region may be comprised of a region of the same main storage.

The address mapping apparatus according to one aspect of the present invention is capable of setting a first address region that is accessible by a processor when a system is booted and a second address region that is expanded by a virtual address. The apparatus comprises an address converting unit for converting a virtual address of the second address region into a physical address, and a decoder logic unit for decoding the first and second address regions so that a first physical address region corresponding to a predetermined part of the first address region and a second physical address region corresponding to a predetermined part of the second address region, access the same address region.

The processor is preferably comprised of a Million Instructions Per Second (MIPS) based processor, and the same address region may be a region of the same main storage. In addition, the system is preferably comprised of a color laser printer system.

A computer-readable medium is provided according to at least one embodiment of the present invention and provides instructions to a computer to execute an address mapping operation. The computer-readable medium comprises instructions for controlling a device to set a first address region that is accessible by a processor when a system is booted and a second address region that is expanded by a virtual address, and map the first and second address regions so that a first physical address region corresponding to a predetermined part of the first address region and a second physical address region corresponding to a predetermined part of the second address region, access the same address region.

BRIEF DESCRIPTION OF THE DRAWINGS

The above and other aspects and features of the present invention will become more apparent by describing certain embodiments of the present invention with reference to the accompanying drawings, in which.

Throughout the drawings, like reference numerals will be understood to refer to like parts, components and structures.

DETAILED DESCRIPTION OF THE EXEMPLARY EMBODIMENTS

Exemplary embodiments of the present invention will now be described by reference to the accompanying drawings.

The matters defined in the description, such as detailed construction and element descriptions, are provided to assist in a comprehensive understanding of the invention. Also, functions or constructions well known to those skilled in the art are omitted for clarity and conciseness.

A memory management method according to embodiments of the present invention can be applied to a system based on a MIPS processor, but is not limited thereto. Embodiments of the present invention can also be applied to any number of systems using different kinds of processors if they substantially satisfy conditions of the present invention.

Figure 1:
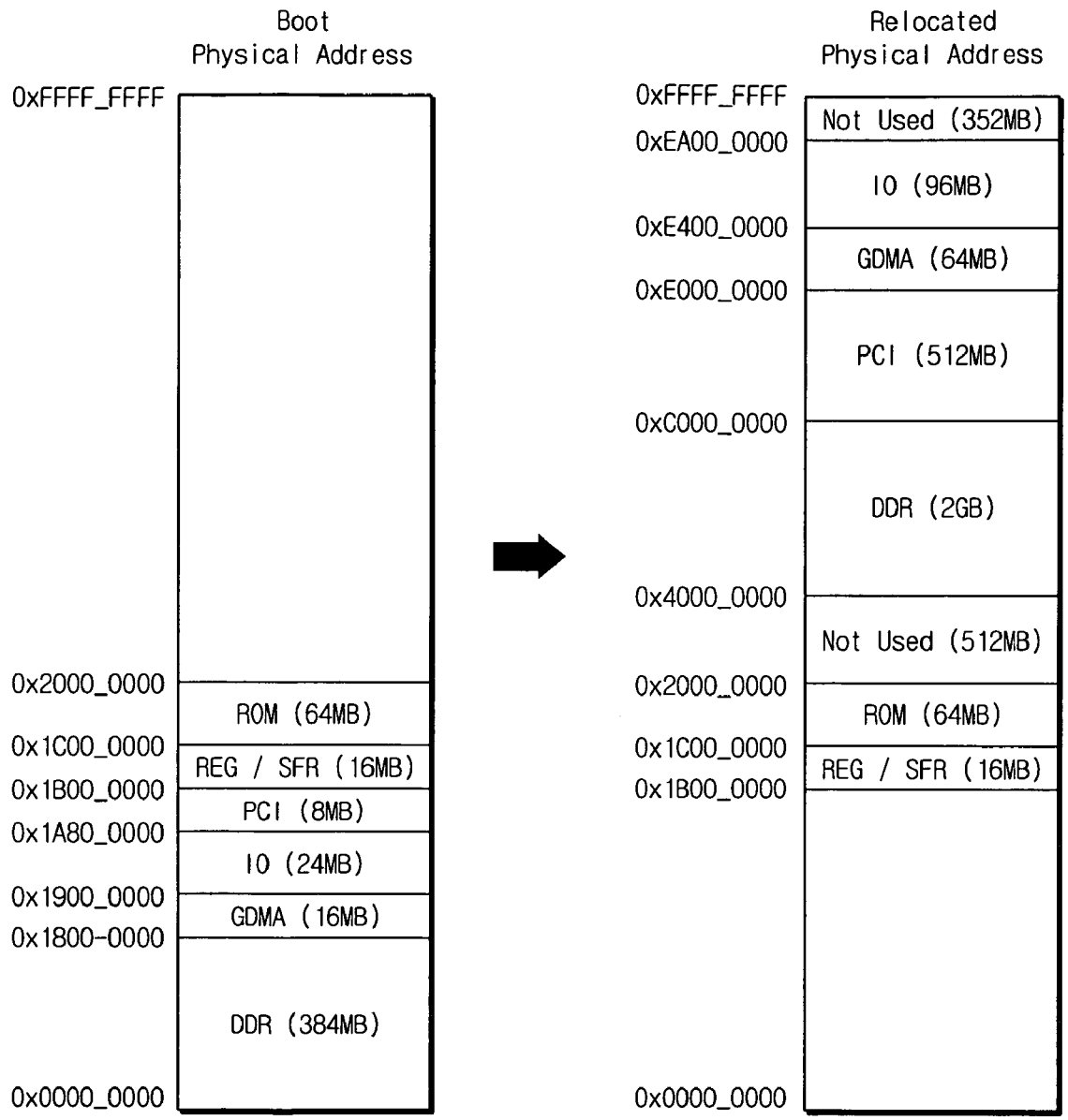
FIG. 1 shows an example of an address map used in a conventional MIPS-based system.
Figure 2:
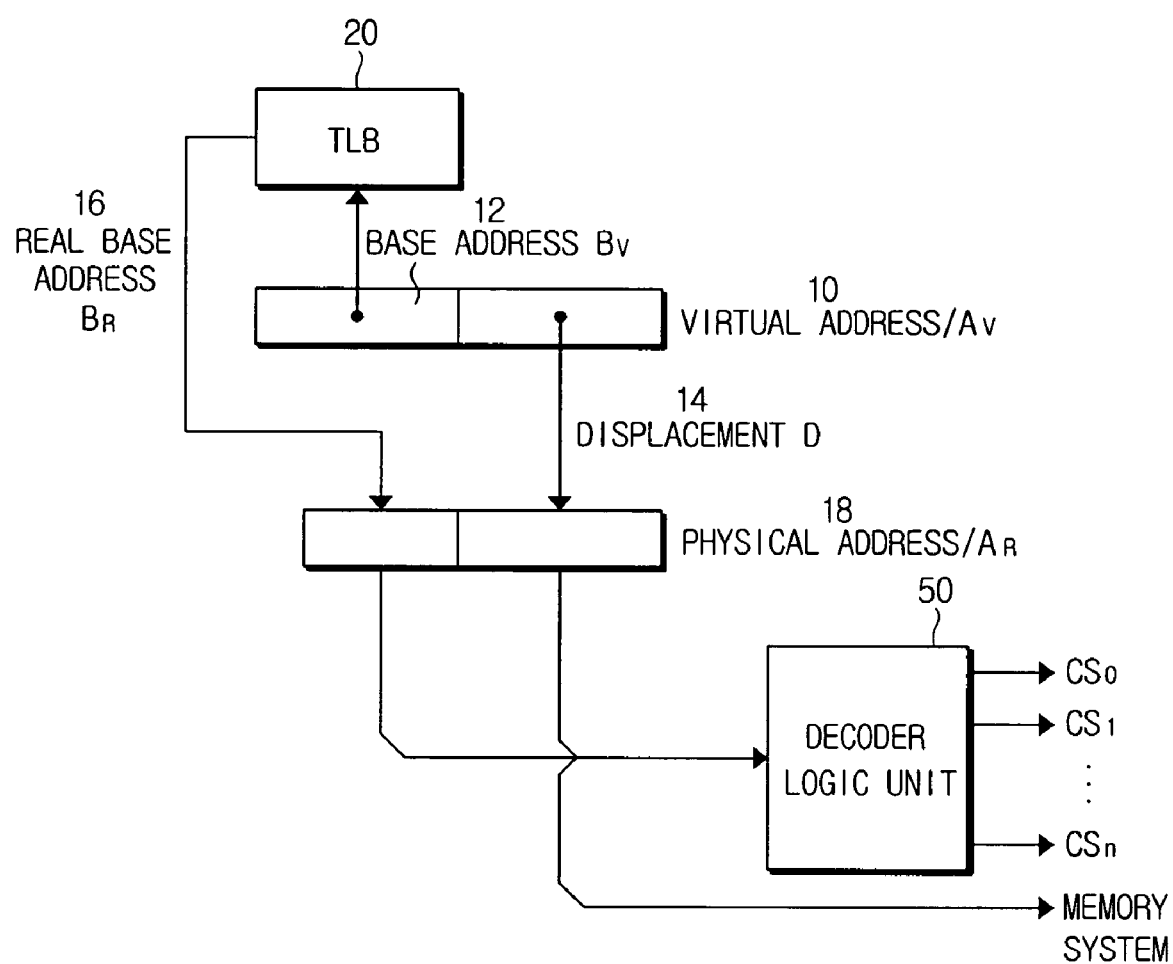
FIG. 2 is a block diagram that shows a system environment to which an address mapping method according to an embodiment of the present invention is applied.

FIG. 2 is a block diagram illustrating an exemplary system environment to which a memory management method according to an embodiment of the present invention is applied. The apparatus of FIG. 2 comprises an address converting unit and a decoder logic unit 50.

Referring to FIG. 2, a virtual address $A_V$ 10 is made by combining a base address $B_V$ 12 with a displacement D 14. The virtual address $A_V$ 10 comprises a real address calculated according to an addressing mode defined in a program, and also comprises control information of segment addresses determined by the system. A real address $B_R=f(B_V)$ of the base address $B_V$ 12 is stored in a page table, and a part of the entire page table is stored in a high-speed memory, namely TLB 20, in the processor so as to rapidly process address change.

An input value of the TLB 20 is the base address $B_V$ 12 of the virtual address $A_V$ 10, and an output value is the real base address $B_R$ 16. This address is added to the displacement D 14 of the $A_V$ 10 to make a physical address $A_R$ 18. If a base address $B_V$ 12 is not in the TLB 20, a part of the page table that includes the $B_V$ 12 is preferentially transmitted to the TLB 20. Thus, the TLB 20 plays a role of cache memory for the page table, and accordingly, the TLB 20 is also called an address cache.

The decoder logic unit 50 receives the physical address $A_R$ 18, and generates Chip Select (CS) signals, namely $CS_0 \sim CS_n$, that enables access to each address region corresponding thereto. A CS signal is generated by decoding corresponding address bits in a superior address of the physical address $A_R$ 18. A subordinate address of the physical address $A_R$ 18 is used as a displacement in a corresponding address region where a CS signal is generated.

In the system environment as described above, the address mapping method of embodiments of the present invention is configured so that the decoder logic unit 50 doubly maps a physical address corresponding to a specific address region. Herein, the term 'doubly mapping' is defined to denote a process wherein different physical addresses are mapped to access the same address region, and is described in greater detail below with reference to an example of an address map.

Figure 3:
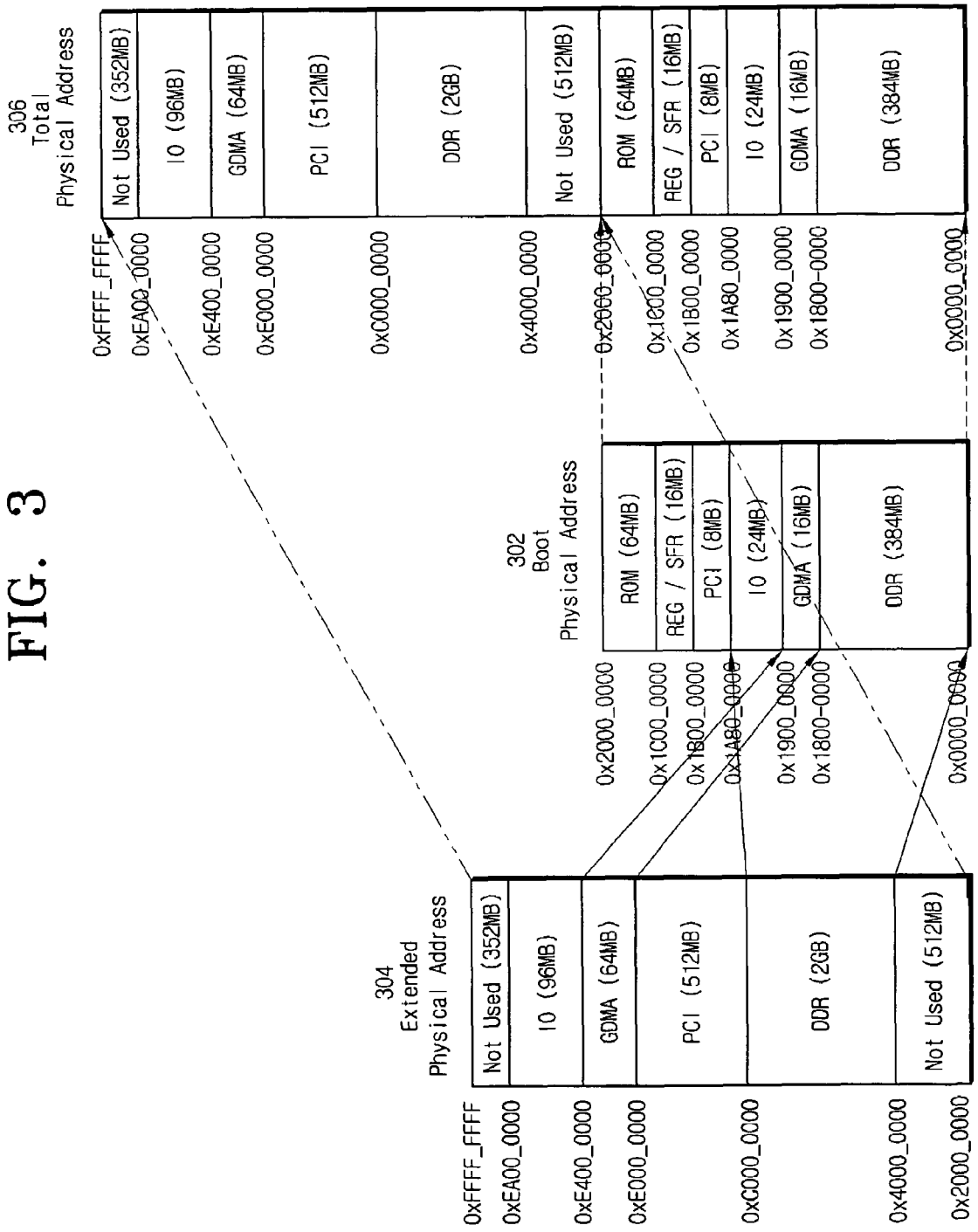
FIGS. 3 and 4 show address maps referred to for illustrating address mapping methods according to embodiments of the present invention.
Figure 4:
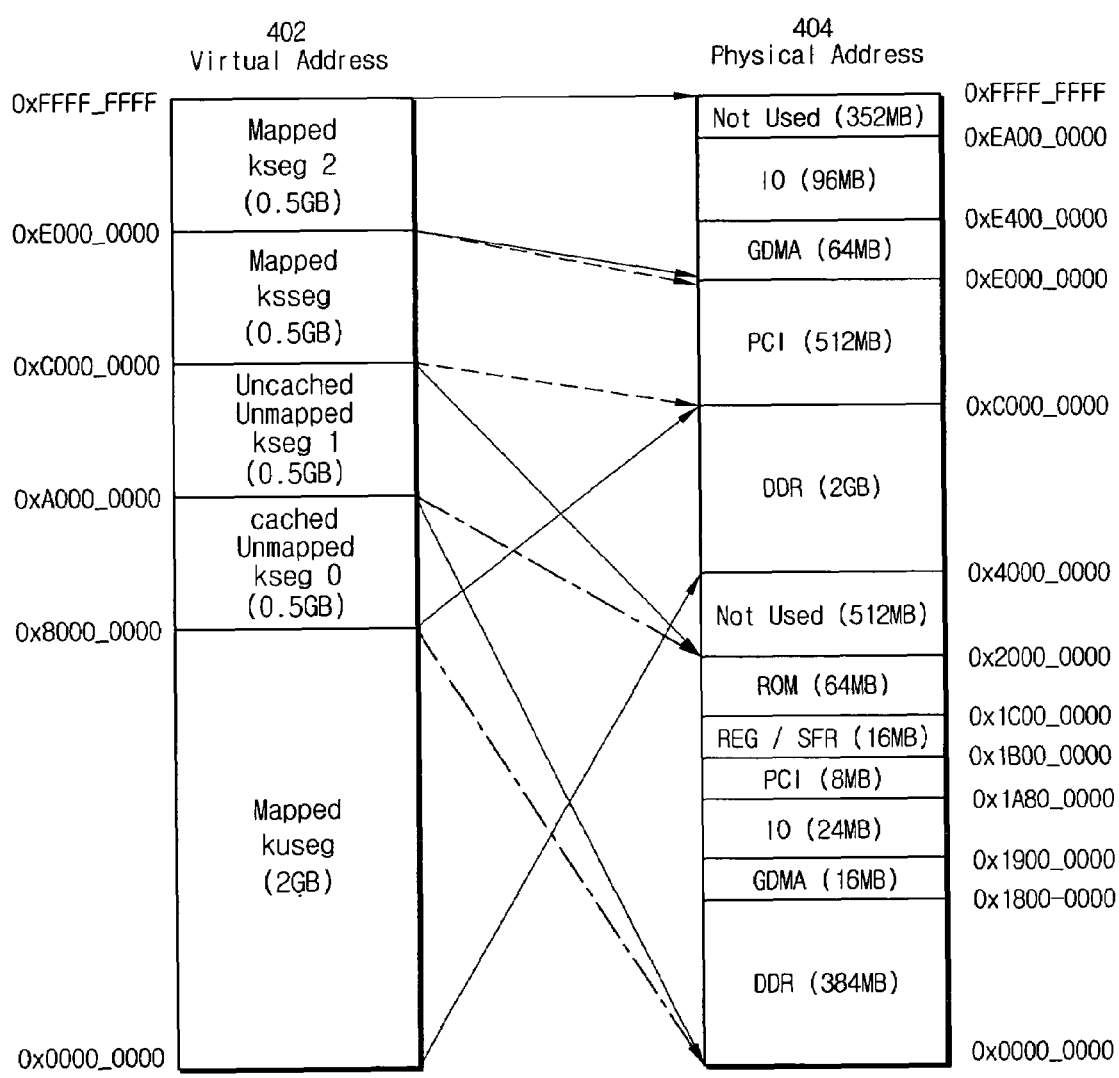

FIGS. 3 and 4 show address maps for illustrating an address mapping method according to embodiments of the present invention. First, in FIG. 3, the area indicated by "Boot Physical Address" 302 is a first address region that may be accessed by the processor at booting, and the area indicated by "Extended Physical Address" 304 is a second address region that is expanded by a virtual address by means of a TLB setting or the like. In addition, the area indicated by "Total Physical Address" 306 shows both the first and second address regions.

In the address map as described above, a physical address corresponding to a region such as DDR and GDMA is doubly mapped. That is, in the first address region 302 having about a 0.5 GB size that may be accessed by the MIPS addressor at booting, and in the second address region 304 having about a 3.5 GB size (for example in the case of a 32 bit address) mapped to a virtual address by means of a TLB setting after booting, a partial region is doubly mapped.

For example, in a system employing a MIPS processor, in a case wherein a DDR RAM region of a 2 GB range is supported, a part of the region is mapped to the first address region that may be accessed by the MIPS processor at booting and the second address region that is an expanded region. The other part is mapped only to the second address region that is an expanded region. That is, the DDR RAM region is mapped to a 384 MB region [0x0000_0000~0x17FF_FFFF] and a 2 GB region [0x4000_0000~0xBFFF_FFFF]. Among them, the 384 MB region [0x4000_0000~0x57FF_FFFF] is decoded by the decoder logic unit 50 to access the same address region as the 384 MB region [0x0000_0000~0x17FF_FFFF]. Thus, the region [0x4000_0000~0x57FF_FFFF] and the region [0x0000_0000~0x17FF_FFFF] access the same DDR RAM region.

FIG. 4 shows an example of an address map of a virtual address and a physical address corresponding thereto. Referring to FIG. 4, in the virtual address map indicated as "Virtual Address" 402, the segment 'kuseg' is a segment having a 2 GB size, which stores user code and data. Addresses in this region utilize cache to the maximum, and they are converted into physical addresses by means of a TLB. This segment region is mapped to a physical address region [0x4000_0000~0xBFFF_FFFF].

The segment 'kseg0' is a system segment having a 0.5 GB size, which uses cache but which does not require address conversion. That is, a virtual address of this segment is corresponding to a 0.5 GB at the front of the physical address space. Thus, the region of this segment is mapped to a physical address region [0x0000_0000~0x1FFF_FFFF]. This segment generally stores a portion of the operation system that is used frequently.

The segment 'kseg1' is also a segment having a 0.5 GB size, which does not use cache and which also does not require address conversion. This segment is used to store a booting code that may not be input to a cache, or to store data such as high-speed I/O data that seriously deteriorates a rate of cache. This segment region is also mapped to the physical address region [0x0000_0000~0x1FFF_FFFF].

The segment 'kseg2' is a segment having a 0.5 GB size, which uses cache and requires address conversion like the 'kuseg' segment. This segment region is mapped to a physical address region [0xE000_0000~0xFFFF_FFFF].

As described above, if a part of the first address region that may be accessed by the processor at booting and the second address region that is mapped to a virtual address by means of a TLB setting is doubly mapped to fix the virtual address and a physical address corresponding to the virtual address, each program may consider an address map of the virtual address without any consideration of reallocation for the physical address. In addition, since the physical address is fixed, the decoder logic unit 50 may generate a CS signal by decoding only address bits corresponding to the address set in the physical address, thereby allowing access to a region corresponding to the address. Thus, combination logic that compares a base address register and a size register is not needed, so the decoder logic unit is simplified.

Though the above exemplary embodiments are illustrated based on the process of conducting decoding by the decoder logic unit 50, the address mapping method of embodiments of the present invention may also be programmed, and not realized using hardware.

As described above, according to embodiments of the present invention, for a region requiring address expansion, a physical address may be doubly mapped for the first address region that may be accessed by the MIPS processor at booting and the second address region that is mapped to a virtual address by means of a TLB setting. Accordingly, the following effects can be achieved.

First, since a physical address is fixed, each program may consider only a map of the virtual address without any consideration of reallocation of the physical address, thereby simplifying the programming procedure.

Second, since a programmer may not voluntarily map the fixed physical address to any address region, malfunctions caused by the incorrect mapping of the address region may be prevented.

Third, since a physical address is fixed, each region may be decoded using only corresponding address bits, so that the decoder logic unit is simplified and thus, performance is improved. Accordingly, no matter how much an address region is divided, additional registers are not required.

The foregoing embodiments and advantages are merely exemplary and are not to be construed as limiting the present invention. The present invention can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for address mapping, comprising the steps of:
setting a first physical address region that is accessible by a processor when a system is booted and a second physical address region that is expanded by a virtual address; and
mapping the first and second physical address regions so that a part of a region of a main storage is doubly mapped to both the first physical address region and the second physical address region, and a remaining portion of the region of the main storage is mapped to the second physical address region only.

2. The method for address mapping according to claim 1, wherein the processor comprises a Million Instructions Per Second (MIPS) based processor.

3. The method for address mapping according to claim 1, wherein the same address region comprises a region of a same main storage.

4. An apparatus for address mapping which is capable of setting a first physical address region that is accessible by a processor when a system is booted and a second physical address region that is expanded by a virtual address, the apparatus comprising:
an address converting unit for converting a virtual address of the second physical address region into a physical address; and
a decoder logic unit for decoding the first and second physical address regions so that a part of a region of a main storage is doubly mapped to both the first physical address region and the second physical address region, and a remaining portion of the region of the main storage is mapped to the second physical address region only.

5. The apparatus for address mapping according to claim 4, wherein the processor comprises a Million Instructions Per Second (MIPS) based processor.

6. The apparatus for address mapping according to claim 4, further comprising a main storage, wherein the same address region comprises a region of a same main storage.

7. The apparatus for address mapping according to claim 4, wherein the system comprises a color laser printer system.

8. A computer program embodied on a computer-readable medium to execute an address mapping operation, which comprises:
a first set of instructions for controlling a device to set a first physical address region that is accessible by a processor when a system is booted and a second physical address region that is expanded by a virtual address; and
a second set of instructions for controlling the device to map the first and second physical address regions so that a part of a region of a main storage is doubly mapped to both the first physical address region and the second physical address region, and a remaining portion of the region of the main storage is mapped to the second physical address region only.

9. The computer program embodied on a computer-readable medium according to claim 8, wherein the processor comprises a Million Instructions Per Second (MIPS) based processor.

10. The computer program embodied on a computer-readable medium according to claim 9, wherein the same address region comprises a region of a same main storage.

* * * * *